United States Patent [19]

Dirks et al.

[11] 3,839,664

[45] Oct. 1, 1974

[54] MAGNETIC DISC HEAD LINEAR MOTOR POSITIONING SYSTEM

[75] Inventors: Gerhard H. Dirks, Los Altos; Wolfgang G. Dirks, Saratoga; Delroy E. Miller, Sunnyvale; Glenn A. Scott, San Jose, all of Calif.

[73] Assignee: Dirks Electronics Corporation, Sunnyvale, Calif.

[22] Filed: Feb. 10, 1972

[21] Appl. No.: 225,047

[52] U.S. Cl. ................ 318/602, 318/687, 318/594, 318/640, 318/135

[51] Int. Cl. ...................... G05b 19/28, G05b 11/00

[58] Field of Search .......... 318/687, 576, 577, 594, 318/602, 603, 640, 135

[56] References Cited

UNITED STATES PATENTS

| | | | |
|---|---|---|---|
| 1,955,676 | 4/1934 | Herchert | 318/687 |
| 2,785,353 | 3/1957 | Fenemore | 318/594 |
| 3,105,963 | 10/1963 | Stevens et al. | 318/576 X |
| 3,156,906 | 11/1964 | Cummins | 318/576 X |
| 3,172,025 | 3/1965 | Jones et al. | 318/687 |
| 3,358,202 | 12/1967 | Pabst et al. | 318/594 |
| 3,426,337 | 2/1969 | Black et al. | 318/576 X |
| 3,436,629 | 4/1969 | Adler | 318/687 |
| 3,495,147 | 2/1970 | Flora | 318/135 |
| 3,512,060 | 5/1970 | Floyd | 318/603 |
| 3,586,950 | 6/1971 | Prodel | 318/640 X |

*Primary Examiner*—T. E. Lynch
*Attorney, Agent, or Firm*—Townsend and Townsend

[57] ABSTRACT

A high precision linear positioning system for the positioning of signal heads in magnetic disc data storage systems or the like employing an actuator having an axially movable magnet rod mechanically linked to the head and a pair of fixed electromagnet coils respectively disposed about the ends of the magnet rod. The coils are suitably energized by an electronic control circuit to impart motive force to the magnet rod. The actuator includes a phototransducer assembly adapted to produce binary coded electrical signals corresponding to the specific track address at which the head is instantly located. The electronic control circuit is adapted for two modes of operation. In the first mode, the electronic control circuit functions to continuously subtract the desired binary track address entered into the system from the instant binary track address produced by the phototransducer assembly, and to velocity servo the actuator in response thereto. In the second mode of operation, employed after the head has reached the desired track, suitable switching circuitry interconnects the electronic control circuit in a position servo mode, employing as input, signals from additional photosensors in the phototransducer assembly, disposed in quadrature, to precisely position and detent the head above the desired track.

11 Claims, 9 Drawing Figures

PATENTED OCT 1 1974 3,839,664

SHEET 5 OF 6

MAGNETIC DISC HEAD LINEAR MOTOR POSITIONING SYSTEM

This invention relates to linear positioning devices, and more particularly, to a signal head actuator system in magnetic disc data storage systems.

In magnetic disc data storage systems, information is stored on a magnetic storage disc on discrete concentric circular tracks. In order to record and/or read information on such discs, it is necessary to precisely position a magnetic signal head adjacent the desired track. Typically, only a small number of heads, often as few as one head, are employed. Accordingly, it is necessary to translate the head or heads radially with respect to the disc, on demand, to align the head with the desired track, by means of a head actuator system. Such a head actuator system may be regarded as comprising two separate but interrelated portions, namely, an actuator or motive device for translating the head and an electronic control circuit adapted to energize and control the actuator.

In modern, high speed disc data storage systems, the head actuator system must fulfill two design criteria: first, the actuator system must be adapted to precisely position the head, since the track width and radial spacing between tracks are both quite small; and second, the actuator system must be adapted to translate the head in a minimum of time, in order to minimize the data access time.

Heretofore, head actuator systems for magnetic disc memories have employed various types of actuators or motive devices. For example, electric motors have been employed in conjunction with mechanical linkages (such as gears, pulleys or the like). Such actuators are disadvantageous in that they are mechanically complex and suffer from an inherent lack of positioning precision caused by mechanical tolerances, such as gear backlash. A more popular actuator employs the so-called voice coil system, wherein a fixed permanent magnet and a movable coil mechanically linked to the head are provided. By suitably energizing the coil, an attractive or repulsive force is created with respect to the permanent magnet, to produce motion of the coil and head. The principal drawback of the voice coil system is the fact that the magnetic field of the coil tends to demagnetize the permanent magnet in the repulsive mode, as the magnetic field produced by the coil counteracts the inherent magnetism of the permanent magnet in this mode. Thus, in time, the permanent magnet tends to be demagnetized. Heretofore, the principal solution to this problem has been to employ a permanent magnet with high coercive force, so as to minimize the tendency toward demagnetization. Such a solution is often unsatisfactory, as it tends to render voice coil systems bulky and inconvenient.

According to the present invention, a novel actuator or motive device employing a pair of fixed coils and a movable magnet is provided. Specifically, an axially movable rod-shaped magnet is employed, with a fixed electromagnet coil disposed about each end thereof. The coils are suitably energized so that the primary motive force is produced by the coil located at the end of the magnet adjacent the direction of motion, via attraction. In this manner, no demagnetization will occur, as attractive magnetic fields, which tend to remagnetize rather than demagnetize, are employed.

According to a preferred embodiment of the present invention, both coils may be energized, employing repulsion and attraction, respectively, to maximize the motive force produced. However, the current to the coil employing repulsion is limited so that the magnetic field produced thereby is below the saturation point on the hysteresis curve of the permanent magnet rod, in order to substantially eliminate demagnetization. Thus, by employing current limiting in the repulsive magnet, the preferred embodiment of the present invention employs a push-pull arrangement to maximize the motive force while substantially eliminating demagnetization of the permanent magnet.

With regard to the electronic control circuitry employed to energize the motive device, the principal system employed heretofore has been the counting technique. Specifically, the head assembly is provided with a sensor for producing an electrical signal each time the head moves past a track location. These signals are counted to determine the number of tracks that the head has moved. Of course, in order to employ such a technique, apparatus is necessary for initializing the head position, to provide a standard reference from which to count tracks. The principal drawback of such a system is the need for initialization which, obviously, prolongs the time required to translate the head. Moreover, such a system is unduly susceptible to spurious electrical signals, which may actuate the counter, thereby causing an incorrect count, so that the head will be prematurely stopped over an incorrect track address.

According to the present invention, an electronic control circuit responsive to specific track address feedback information is provided. Specifically, the actuator is provided with a phototransducer assembly which produces binary coded electrical signals corresponding to the specific track address at which the head is located. These signals are applied to the electronic control circuit, which is adapted to subtract the desired binary track address entered into the system from the instant binary track address produced by the phototransducer assembly, thereby producing a digital difference signal representative of the number of tracks or distance from the instant location of the head to the desired location of the head. This difference signal is converted into a suitable voltage to drive a velocity servo system. Since the instant address constantly changes with the movement of the head, the velocity signal will be changed accordingly, so that the head will be optimally accelerated and decelerated. Furthermore, positioning error will be substantially eliminated, as the head will come to rest only if the instant address, as produced by the phototransducer assembly, corresponds to the desired address.

According to a preferred embodiment of the present invention, the phototransducer assembly comprises a plurality of fixed photosensors and a binary coded optical mask movably mounted to the head assembly and disposed between the photosensors and suitable light sources. The optical mask is coded in accordance with the binary addressed of the tracks, so that the photosensors will produce electrical signals representative of the binary address of each track. The electronic control circuit according to a preferred embodiment is adapted for two modes of operation. In the first mode of operation, or velocity servo mode, the electronic control circuit will energize the actuator to drive the head to the position where the binary number produced by the photosensors corresponds to the desired binary number, as previously described. In the second mode of operation, employed after the head has reached the desired track, suitable switching circuitry is energized to interconnect the servo amplifier in a position servo system mode, employing as input, signals from two additional photosensors disposed in quadrature, to precisely position or detent the head above the desired track.

Accordingly, the magnetic disc head actuator system according to the present invention is advantageous in that it minimizes the transit time of the head, while providing greater accuracy than that heretofore attained according to the counting technique. Moreover, the actuator or motive device of the present invention is less bulky and less subject to demagnetization than the prior art voice coil systems typically employed.

These and other objects, features and advantages of the present invention will be more readily apparent from the following detailed description of the preferred embodiment, wherein reference is made to the accompanying drawings, in which.

Figure 1:
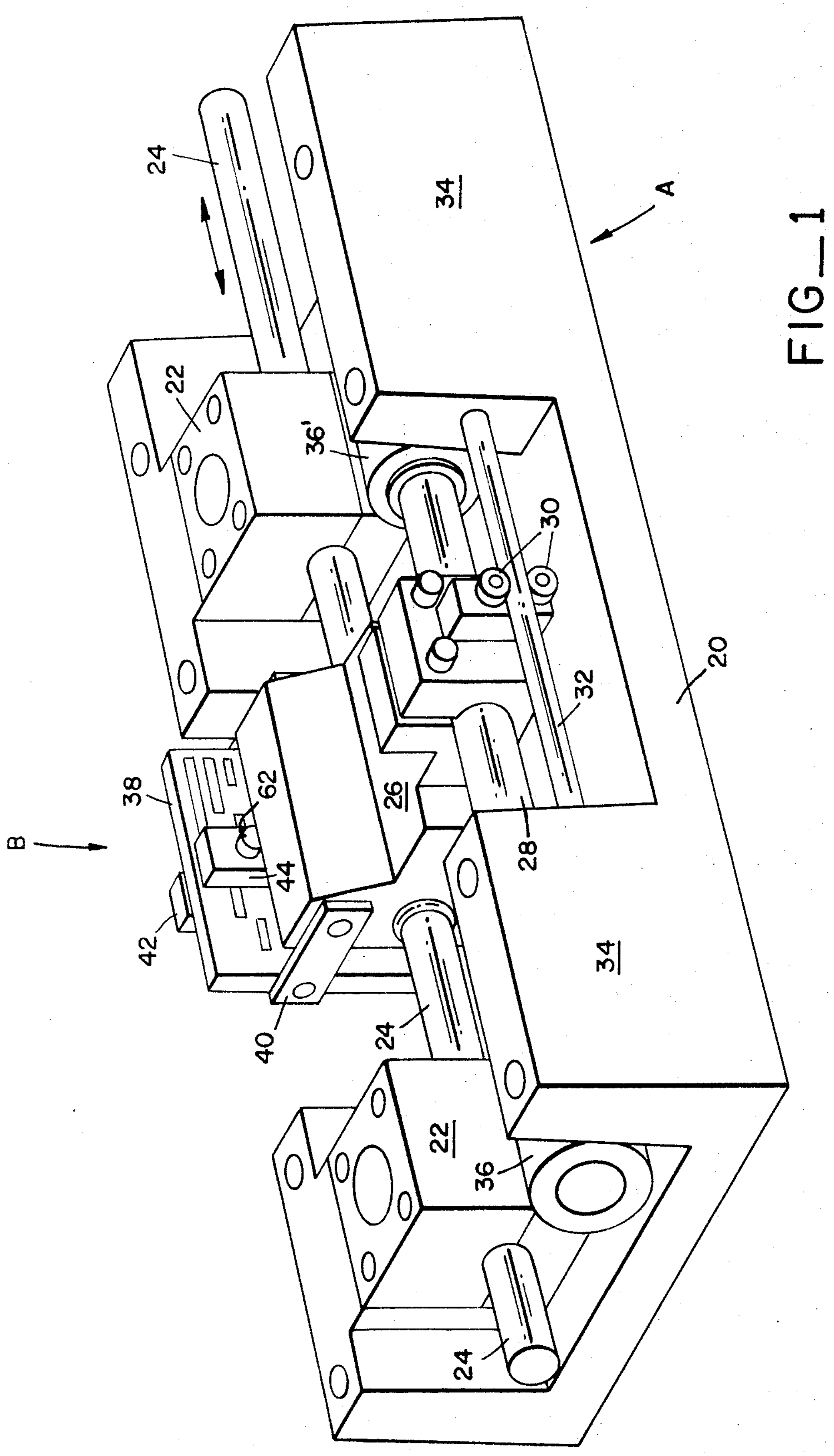
FIG. 1 is a perspective view of the head actuator mechanism according to the present invention.
Figure 2:
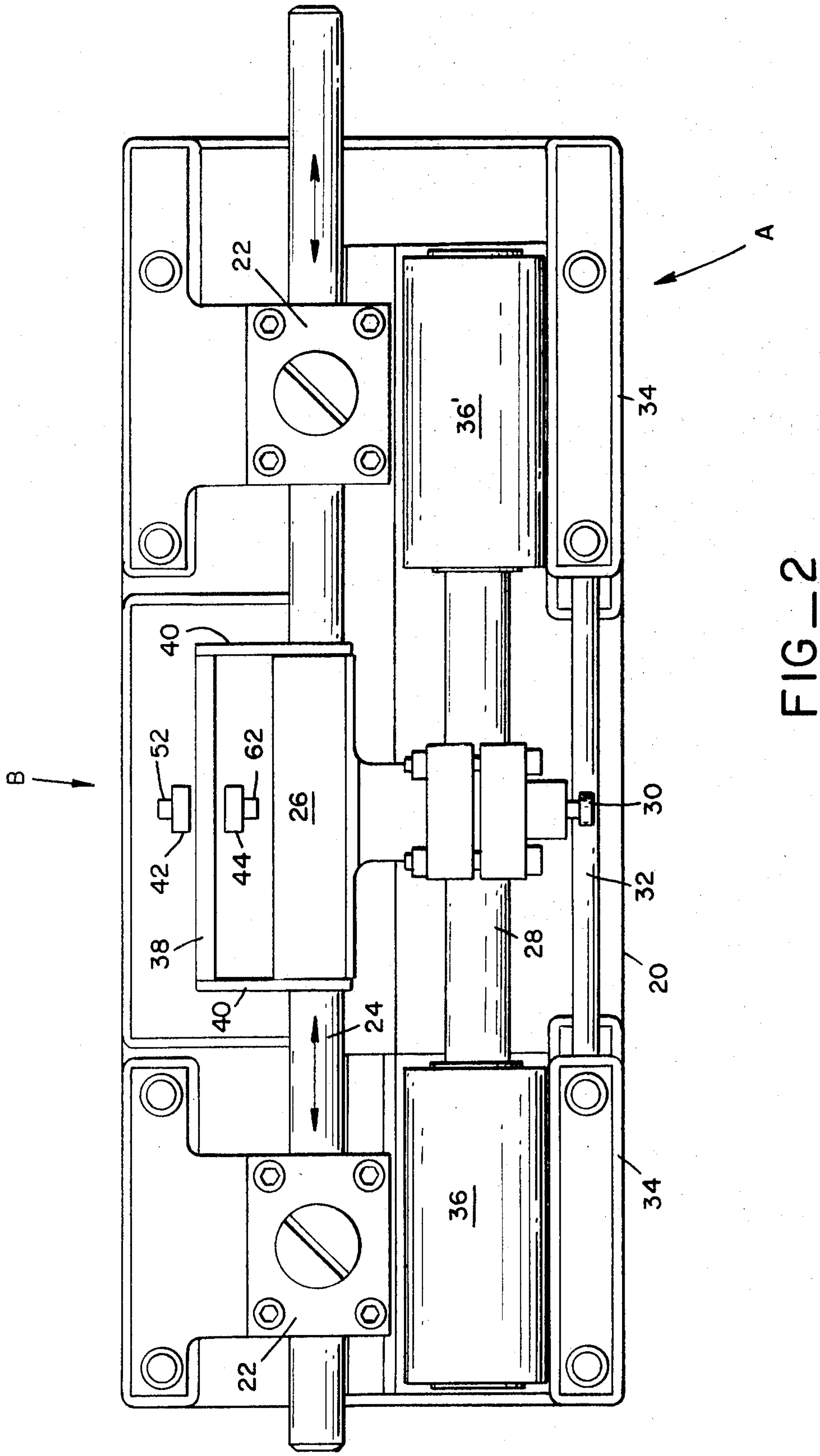
FIG. 2 is a plan view of the apparatus depicted in FIG. 1.

Referring now to the drawings, FIGS. 1 and 2 depict the actuator or motive device A according to the present invention. Specifically, actuator A comprises a base plate 20 carrying a pair of spaced apart linear bearing blocks 22. A shaft 24 is supported by the bearings in bearing blocks 22 for linear axial movement, as indicated by the arrows in FIGS. 1 and 2. Actuator A is suitably disposed so that shaft 24 is radially directed with respect to the magnetic disc (not shown). A magnetic signal or read/write head (not shown) is mounted on one end of shaft 24 adjacent the magnetic disc. Thus, axial movement of shaft 24 will produce radial movement of the head with respect to the magnetic disc.

A yoke 26 is mounted on shaft 24 intermediate bearing blocks 22. Yoke 26 functions to ridgidly interconnect shaft 24 with a magnetic rod 28, magnet rod 28 being parallel to and spaced apart from shaft 24. Yoke 26 carries a pair of bearing rollers or wheels 30. Bearing wheels 30 engage a shaft 32 which is supported by a pair of shaft supporting blocks 34 in parallel with shaft 24 and magnet rod 28. Bearing wheels 30 and shaft 32 cooperate to support the weight of yoke 26 and magnet rod 28, so as to prevent rotation thereof with respect to the axis of shaft 24. Accordingly, bearing blocks 22, bearing wheels 30 and shaft 32 cooperate to support shaft 24, yoke 26 and magnet rod 28, while readily permitting axial movement thereof.

A pair of electromagnet coils 36 and 36' are mounted to base plate 20 on respective sides of, and in alignment with, magnet rod 28. Specifically, coils 36 and 36' have a hollow cylindrical interior dimensioned to permit the passage of magnet rod 28 therethrough. Coils 36 and 36' are mounted with the hollow cylindrical interiors thereof in alignment with the axis of magnet rod 28. Thus, axial movement of shaft 24 will be accompanied by axial movement of magnet rod 28 into and out of the interior of coils 36 and 36', respectively. As will be described in greater detail hereinafter, coils 36 and 36' are suitably energized to impart axial force to magnet rod 28. This will cause magnet rod 28 to move axially which, of course, will be accompanied by axial movement of shaft 24. This, in turn, results in the desired radial movement of the head with respect to the magnet disc.

Base plate 20 additionally carries a phototransducer assembly B. Phototransducer assembly B comprises an optical mask 38 mounted to yoke 26 by brackets 40. In this manner, optical mask 38 will move concurrently with shaft 24 and the read/write head. As will be described in greater detail hereinafter, mask 38 has optically coded thereon binary information corresponding to the various track addresses.

Disposed on opposite sides of optical mask 38, and rigidly mounted to base plate 20, are a photosensor support 42 and a lamp support 44. As will be described in greater detail hereinafter, photosensor support 42 carries a plurality of photosensors such as photodiodes, phototransistors or the like, mounted in alignment with the binary information optically coded on mask 38. Lamp support 44 carries a plurality of lamps or other light sources in registration with the alignment of photosensors on photosensors support 42. Thus, the light emitted by the lamps will illuminate the respective photosensors through optical mask 38. By providing transparent and opaque areas on optical mask 38 in spaced relation, the incidence of light on the photosensors will be dependent upon the position of optical mask 38, and will thus be dependent upon the radial position of the read/write head.

Figure 3:
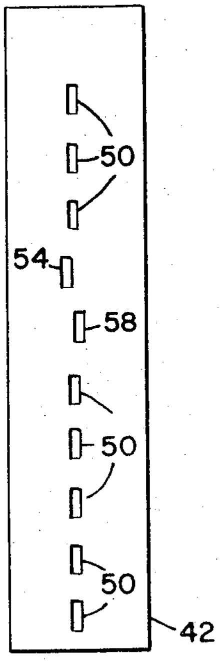
FIG. 3 is a front view of the photosensor support of the apparatus depicted in FIG. 1.
Figure 4:
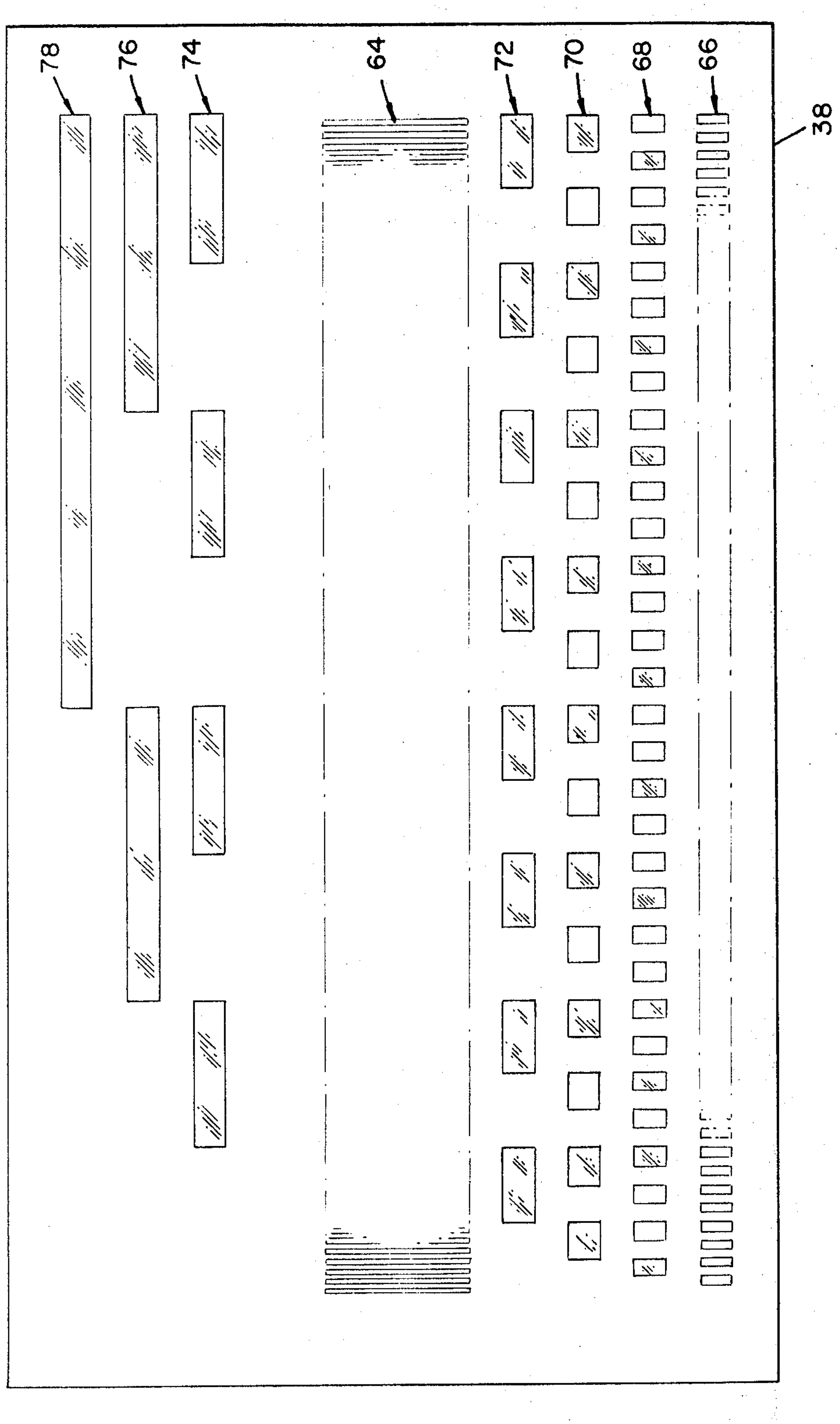
FIG. 4 is a front view of the optical mask of the apparatus depicted in FIG. 1.

Referring now to FIGS. 3 and 4, phototransducer assembly B will now be described in greater detail. Referring specifically to FIG. 3, there is depicted photosensor support 42. Photosensor support 42 comprises eight photosensor apertures or transparencies 50, arranged in spaced apart vertical alignment. Disposed behind each of the apertures 50 is a photosensor 52, such as a photoconductor, photodiode, phototransistor or the like. As will be more readily apparent hereinafter, each of the photosensors 52 is thus aligned with a horizontal row of optical coded binary information on optical mask 38. Photosensor support 42 further includes two apertures 56 and 58 which are vertically spaced apart and horizontally offset with respect to the center line of apertures 50. Specifically, the righthand edge of aperture 54 and the lefthand edge of aperture 58 are on the center line. Disposed behind apertures 54 and 58 are a pair of photosensors 56 and 60, respectively. As will be described in greater detail hereinafter, photosensors 56 and 60 may be regarded as being disposed in quadrature, to produce, in cooperation with optical mask 38, an electrical signal employed by the electronic control circuit of the head actuator system to position servo the actuator.

Lamp support 44 is generally similar in appearance to photosensor support 42. Specifically, lamp support 44 has mounted thereon a plurality of light sources 62, such as lamps, light-emitting semiconductors or the like, in alignment and registration with apertures 50, 54 and 58. Accordingly, the light emitted by light sources 62 is directed onto photosensors 52, 56 and 60, through optical mask 38.

Referring now to FIG. 4, there is depicted optical mask 38. Optical mask 38 may be regarded as having optically coded thereon eight horizontal rows of binary information. Specifically, the eight binary rows of information 64, 66, 68, 70, 72, 74, 76 and 78 represent the various digits or places of an eight-digit binary track address. Row 64 represents the least significant digit of the binary track address, while row 78 represents the most significant digit, the significance of the intermediate digits increasing with increasing reference numbers. By providing eight rows of binary information, the largest track address is $2^8$ or 256. Thus, the preferred embodiment described herein is adapted for use with 256 distinct tracks. Of course, should a greater or lesser number of track addresses be employed, a greater or smaller number of binary rows of information, and the respective photosensors and light sources, may be employed.

The nature of the binary coded information on rows 64, 66, 68, 70, 72, 74, 76 and 78 is in the form of transparent and opaque areas. Specifically, an opaque area, which will prevent the illumination of the associated photosensor when disposed between the photosensor and its associated light source, corresponds to a first binary state, for example, 0, while a transparent area or aperture which will permit illumination of the photosensor by the associated light source, corresponds to the second binary state, for example, 1. Since the electrical signal produced by the photosensor is dependent upon its level of illumination, it is thus apparent that the electrical signals produced by photosensors 52 are binary coded in accordance with the various track addresses.

Row 64, which represents the least significant digit of the binary track address, consists of alternate transparent and opaque areas. Since the least significant digit is alternatively 0 or 1, as the track address numerically increases, the alternation occurring upon each track address increase, the width of each opaque and transparent area equals one track width. With each subsequent more significant digit, the rate of alternation between 0 and 1 decreases by a factor of 2. Thus, row 66, corresponding to the second binary digit, consists of alternate opaque and transparent areas of two track widths. Similarly, cows 68, 70, 72, 74, 76 and 78 consist of alternate opaque and transparent areas of four, eight, 16, 32, 64 and 128 track widths, respectively.

Each column on optical mask 38 is thus one track width wide and has optically coded thereon a binary number. Thus, optical mask 38 may be regarded as having 256 adjacent columns, each column having optically coded thereon a binary number, the columns being arranged in order of increasing magnitude of the binary numbers or track addresses.

Accordingly, the optical mask 38 is aligned with respect to the read/write head, so that when the head is over a track, the column on optical mask 38 having the binary number associated with that track coded thereon is aligned with photosensor apertures 50 on photosensor support 42. Thus, the electrical signals produced by photosensors 52 will correspond to the various digits of the binary track address over which the head is disposed. These electrical signals are employed by an electronic control circuit C to control the translation of the head by the actuator A, in a manner to be described in greater detail hereinafter.

As briefly referred to hereinbefore, optical mask 38 is also employed, in conjunction with photosensors 56 and 60, to generate electrical signals employed by electronic control circuit C to precisely position or detent the head. Specifically, row 64 of optical mask 38 is vertically elongate and aligned with one of the photosensors 52 and photosensors 56 and 60. As referred to hereinbefore, each of the opaque and transparent areas in row 64 is one track width wide and are so disposed that either a transparent area or an opaque area will be centered with respect to the center line of photosensors 52 when the head is centered on a track. Since photosensors 56 and 60 are offset with respect to the center line of photosensors 52, it is apparent that the center of either a transparent area or an opaque area will be aligned with the common edge of photosensors 56 and 60 when the head is centered on a track.

Figure 5:
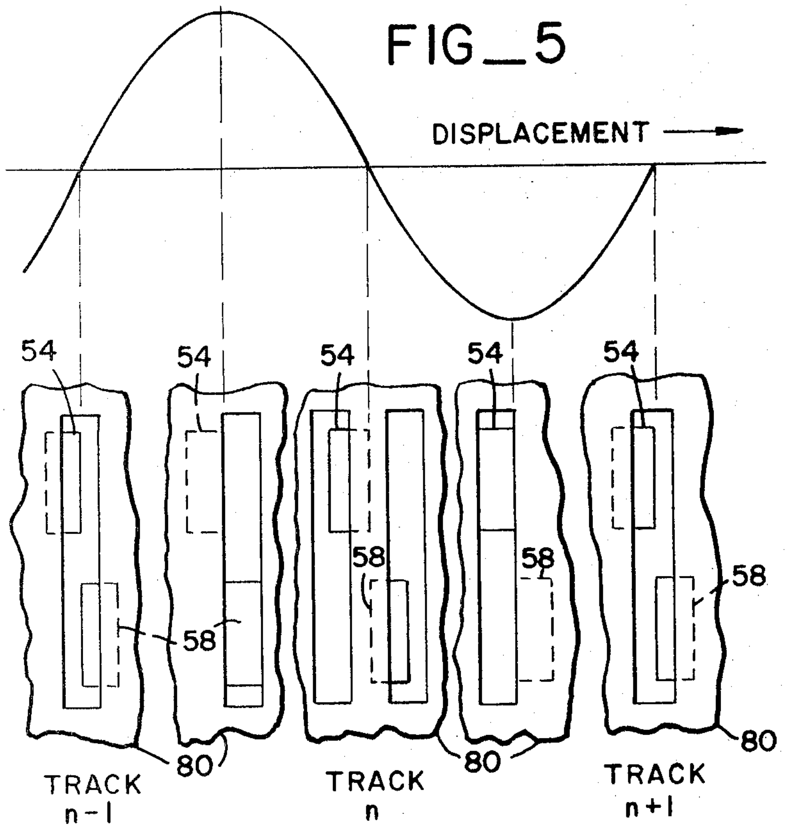
FIG. 5 is a cartoon series of diagrammatic views showing the alignment of a portion of the optical mask with a portion of the photosensor support, at various head positions, and including a graphical representation of the electrical signal derived therefrom.

Referring to FIG. 5, there is depicted the relative positioning of the transparent and opaque areas of row 64 for five different displacements of the read/write head. It is apparent therefrom that when either a transparent area or an opaque area is centered about the common edge of photosensors 56 and 60, both photosensors 56 and 60 are equally partially illuminated. At other head positions, one of the photosensors 56 and 60 will be illuminated more than the other. Thus, by subtracting the electrical output signals of photosensors 56 and 60 from one another, a composite electrical signal which varies in a quasi-sinusoidal manner with respect to the displacement of the head is produced. Furthermore, each zero-crossing of the quasi-sinusoidal signal represents the positioning of the head at the center of a track. Accordingly, as will be more readily apparent hereinafter, the electrical signals produced by photosensors 56 and 60 are subtracted from one another and employed to drive a position servo loop to precisely position or detent the head above the center of the track. Moreover, it is apparent that during the translation of the head, the frequency of the quasi-sinusoidal signal is proportional to the velocity of the head. Accordingly, during translation of the head, the quasi-sinusoidal signal is employed to derive velocity feedback information, in a manner to be described in greater detail hereinafter.

Figure 6:
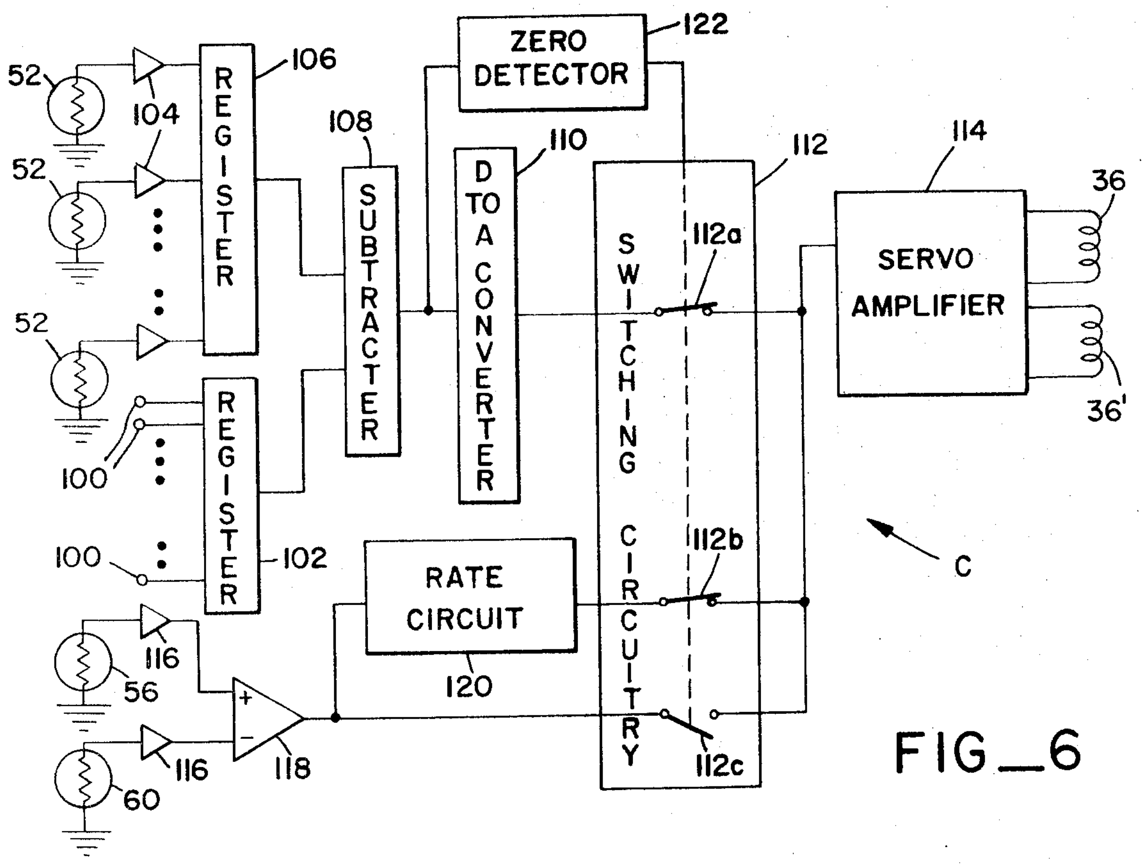
FIG. 6 is a block diagram of the electronic control circuit according to the present invention.
Figure 7:
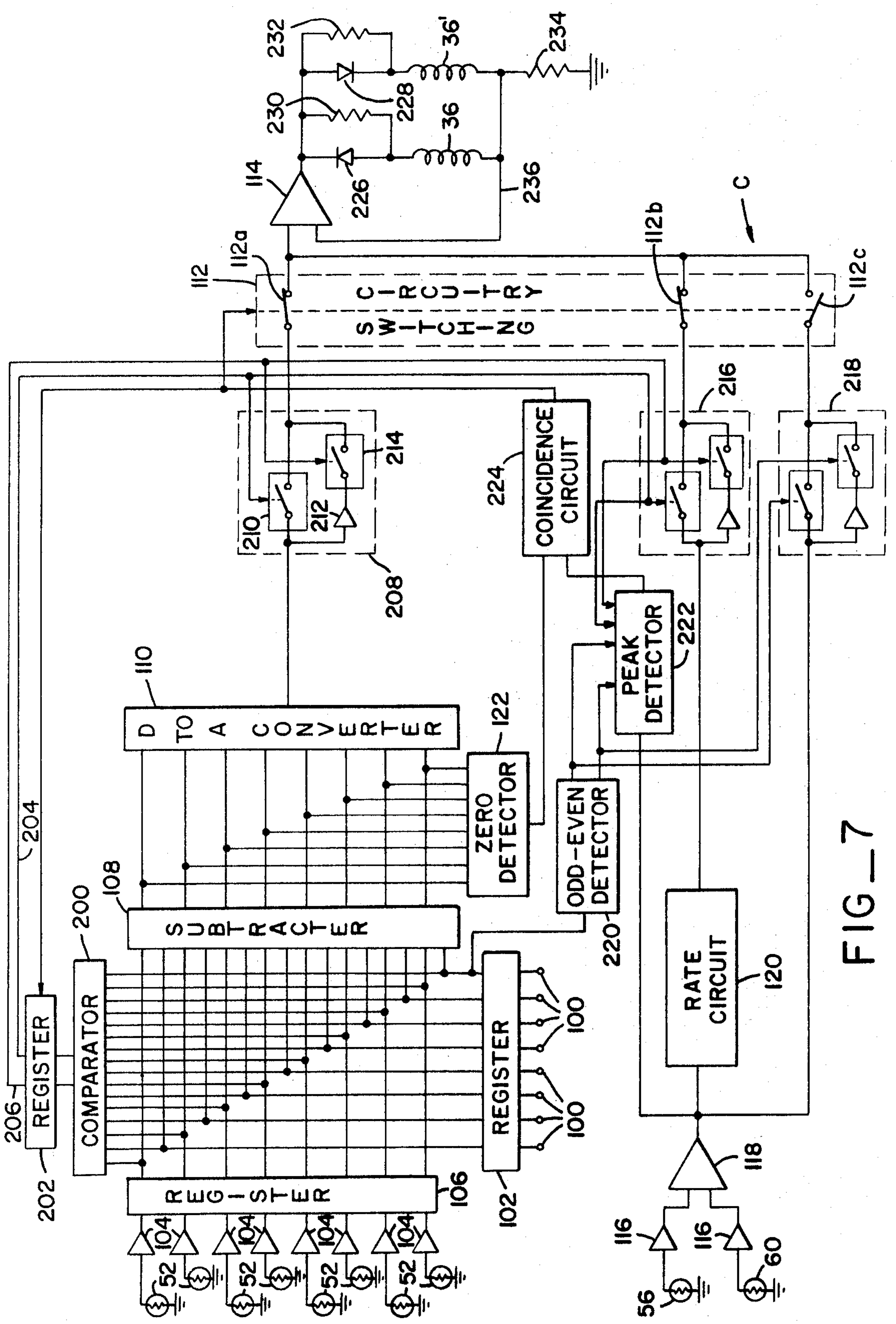
FIG. 7 is a more detailed block diagram, partially in schematic form, of the apparatus depicted in FIG. 6.

Referring now to FIGS. 6 and 7, the electronic control circuit C according to the present invention will now be described. Referring initially to FIG. 6, which is a simplified block diagram of the electronic control circuit C according to the present invention, its overall structure and operation will now be described. Input to electronic control circuit C comprises a desired binary coded track address applied to a plurality of input terminals 100. Input terminals 100 are connected to the inputs of a binary register 102 which functions to store the desired binary track address during the head translation operation. Typically, the desired binary track address is, of course, produced by a digital computer.

Each of the photosensors 52 of phototransducer assembly B is connected to the input of a photosensor amplifier 104. Photosensor amplifiers 104 function to amplify the electrical signals produced by photosensors 52 and thus to translate the low-level electrical signals produced by photosensors 52 into distinct voltage levels compatible with the logical implementation of electronic control circuit C. Thus, for example, photosensor amplifiers 104 may be adapted to produce a voltage level corresponding to a logic 1 signal when photosensors 52 are illuminated, while producing a voltage level corresponding to the logical 0 when phototransducers 52 are not illuminated. The outputs of photosensor amplifiers 104 are connected to the inputs of a binary register 106, substantially identical to register 102. Since photosensors 52 are illuminated in accordance with the instant binary track address of the head, as previously described, it is apparent that the instant binary track address is thus entered into register 106.

Registers 102 and 106 are connected to a subtracter 108, which functions to subtract the desired and instant binary track addresses, to produce a binary number corresponding to the number of tracks or distance the head is to be translated at any given instant. Since the instant track address continuously changes during translation of the head, it is apparent that the difference signal produced by subtracter 108 will continuously change during translation of the head to reflect the remaining number of tracks or distance to be translated.

The difference signal thus produced by subtracter 108 is applied to a digital-to-analog converter 110, which, as its name applies, functions to convert the binary difference signal into a voltage proportional thereto. Specifically, digital-to-analog converter 110 may preferably comprise a binary weighted resistance switching ladder network.

The output of digital-to-analog converter 110 is connected to switching circuitry 112. Switching circuitry 112 functions to interconnect the components of electronic control circuit C for two modes of operation. Switching circuitry 112 is graphically depicted as comprising three mechanical switches 112*a*, 112*b* and 112*c*, the positions of which are depicted in the first mode of operation employed during the head translation operation. Of course, in reality, electronic switching devices, such as field effect transistors or the like, are employed, the mechanical switches being depicted herein for illustrative purposes only, to facilitate the understanding of the present invention. In the first mode of operation, switching circuitry 112 functions to apply the signal produced by digital-to-analog converter 110 to the input of servo amplifier circuit 114. The outputs of servo amplifier 114 are applied to electromagnet coils 36 and 36′ of the actuator A. Servo amplifier 114 functions to apply appropriate currents to coils 36 and 36′ in response to the voltage applied thereto.

In order to provide a closed loop velocity servo system in the first mode of operation, a feedback velocity signal is applied to servo amplifier 114, in addition to the signal from digital-to-analog converter 110. While such a feedback signal may typically be produced by an electromechanical velocity transducer, according to the present invention the feedback velocity signal is generated from phototransducer assembly B.

Specifically, the illumination of photosensors 56 and 60 varies in a quasi-sinusoidal manner with the motion of the head and optical mask 38, since, as previously described, alternate transparent and opaque areas will be translated between transducers 56 and 60 and their respective light sources during motion of the head assembly. Photosensors 56 and 60 are respectively connected to the inputs of two amplifiers 116, which function to amplify the relatively weak electrical signals produced thereby. The amplified signals produced by amplifiers 116 are connected to the inputs of a differential amplifier 118. Since photosensors 56 and 60 are offset with respect to one another, it is apparent that the quasi-sinusoidal signals produced thereby will be in quadrature, or 90° out of phase. Amplifier 118, by differencing the photosensor signals, functions to produce a signal quasi-sinusoidal signal, as graphically depicted in FIG. 5.

Referring again to FIG. 5, the composite quasi-sinusoidal signal produced by amplifier 118 is depicted, along with the relative position of the transparent and opaque areas in optical mask 38 with respect to photosensors 56 and 60, at various head positions, and thus at various instants with respect to the depicted composite signal. The peak magnitude of the difference or composite signal produced by amplifier 118 is, of course, constant. However, it is apparent that the frequency of the composite signal is dependent upon the velocity of the head and optical mask 38. Accordingly, a signal representative of the velocity may be derived from an examination of the frequency of the composite signal produced by amplifier 118.

To this end, the output of amplifier 118 is connected to the input of a rate circuit 120. Tachometer circuit 120 may typically comprise a differentiator circuit, since it is apparent that the rate of change of the composite signal and thus its derivative, are proportional to the velocity. Of course, rate circuit 120 may incorporate a full wave rectifier circuit prior to the differentiator circuit, in order to prevent the negative portion of the differentiated composite signal from cancelling the positive portion of the differentiated composite signal. Alternatively, other suitable frequency responsive circuitry may be employed to derive a voltage signal proportional to the velocity of the head from the composite signal produced by differential amplifier 118.

The output of rate circuit 120 is applied, via switch 112*b* of switching circuitry 112 in the first mode of operation, to the input of servo amplifier 114, to function as a velocity feedback signal as briefly referred to hereinbefore. Thus, in the first mode of operation, the electronic control circuit C may be regarded as forming a velocity servo loop or system, the servo amplifier 114 functioning to drive coils 36 and 36′, so that the velocity of the head is proportional to the instantaneous distance from the actual head position to the desired track. In this manner, it is apparent that the time duration of the head translation operation will be substantially minimized, as initially, the head will be quickly accelerated to a relatively high velocity, and, as the head approaches the desired track, it will gradually decelerate to prevent overshoot.

The state of switching circuitry 112 is controlled by a zero detector circuit 112. Zero detector 112 is con- 214 may preferably comprise field effect transistors or the like, the mechanical switches depicted in FIG. 7 being for illustrative purposes only.

As is apparent from FIG. 7, a second controllable inverter circuit 216, substantially identical to inverter 208, is interposed between rate circuit 120 and switching circuitry 112. The purpose of inverter 216 is to render the polarity of the velocity feedback signal produced by rate circuit 120 compatible with the polarity of the signal applied to servo amplifier 114 via inverter 208. This is necessitated as according to the preferred embodiment of the present invention, the signal produced by rate circuit 120 is also independent of the direction of head translation. Of course, if a rate circuit 120 capable of producing a signal whose polarity is dependent upon the direction of head translation is employed, inverter 216 may be omitted.

Accordingly, inverters 208 and 216 cooperate to apply input and feedback signals to servo amplifier 114 in the velocity servo mode or first mode of operation, whose polarity is dependent upon the desired direction of translation. Thus, as will be more readily apparent hereinafter, servo amplifier 114 is adapted to energize the electromagnets 36 and 36′ of the actuator A in a manner dependent upon the polarity of the signals applied thereto, to determine the direction of head translation.

A second aspect of the electronic control circuit C not heretofore described relates to the second or position servo mode of operation. Specifically, referring briefly to FIG. 5, it is apparent that each zero-crossing of the composite signal produced by differential amplifier 118 corresponds to a specific track position. Since the various zero-crossings are only 180° apart with respect to the quasi-sinusoidal signal, it is apparent that the relative polarities of the signal produced by slight excursions from the track position will be dependent upon the specific zero-crossing. For example, an excursion to the right at track n will produce a negative signal, while an excursion to the right at track $n-1$ or track $n+1$ will result in a positive signal. Accordingly, it is apparent that the polarities caused by excursions about an odd numbered track will differ from the polarities produced by excursions about an even numbered track. In order to successfully position servo in response to this signal, two alternatives are possible. First, by employing narrower transparent and opaque areas on optical mask 38, it is possible to make each track position correspond to every second zero-crossing, so that the zero-crossings will be 360° apart. However, such a solution is presently not preferred as, by rendering the transparent and opaque areas on optical mask 38 finer, it tends to increase the inaccuracies thereof, so as to degrade positioning accuracy.

Thus, according to the preferred embodiment of the present invention as depicted in FIG. 7, it is presently preferred to selectively invert the composite signal produced by differential amplifier 118, depending upon whether the desired track address is odd or even. To this end, a controllable inverter circuit 218, substantially identical to inverters 208 and 216, is interposed between differential amplifier 118 and electronic switch 112c of switching circuitry 112. The electronic switch positions of inverter 218 are controlled by signals produced by an odd-even detector 220. Odd-even detector 220 is connected to the least significant digit of register 102. It is apparent that the least significant digit of register 102 will be 0 for an even track address and 1 for an odd track address. Thus, odd-even detector 220 functions to examine the least significant digit of the desired track address, and to control inverter 218 in response thereto. In this manner, the polarities produced by excursions about a track position will be similar for all track positions, so as to produce the appropriate polarity signals for position servo operation in the second mode.

A third aspect of electronic control circuit C depicted in FIG. 7 relates to the manner in which the mode of operation thereof is controlled. Specifically, as previously described, switching circuitry 112 is responsive to the presence of a zero output of subtracter 108, as detected by zero detector 122. However, it has been found desirable to incorporate additional circuitry to more precisely define the instant at which switching circuitry 112 is actuated into the second mode of operation.

In this regard, the composite signal produced by differential amplifier 118 is applied to a peak detector 222. The outputs of odd-even detector 220 and the high or low signals from register 202 are applied to peak detector 222, to condition peak detector 222 to detect only positive or negative peaks, depending upon whether or not the desired track address is odd or even, and the direction from which the head is translated. The ultimate objective of such conditioning is to condition peak detector 222 to produce a pulse at a peak approximately one-half track from the desired track address.

Thus, in the example depicted in FIG. 5, if the desired track address corresponds to track $n$, the head was to be translated from left to right, peak detector 222 is conditioned to be responsive to positive peaks only. Conversely, if track $n$ was to be approached from right to left, peak detector 222 is conditioned to respond to negative peaks only. In this manner, peak detector 222 will produce a pulse approximately one-half track width from the desired track position. Of course, for desired track addresses $n-1$ or $n+1$, peak detector 222 must be conditioned to respond to negative peaks for left to right translation and positive peaks for right to left translation. Accordingly, peak detector 222 generally comprises a peak detector circuit and appropriate logic or gating circuitry to accomplish the thus described conditioning.

Thus, peak detector 222 will produce a pulse when the head is one-half track width from the desired track address. This signal is applied to a coincidence circuit 224, to which the output of zero detector 122 is also applied. Coincidence circuit 224 may typically comprise an AND gate, so that an output signal will be produced upon the presence of both a signal from zero detector 122 and a peak signal from peak detector 222. The output of coincidence circuit 224 is thus connected to the control input of switching circuitry 112. In this manner, it is assured that switching circuitry 112 will be actuated when the head is one-half track width from the desired location. By thus requiring a coincidence between two events for the actuation of switching circuitry 112, the possibility of switching circuitry 112 being spuriously actuated is substantially minimized. Accordingly, the possibility of prematurely terminating the translation of the head and thus positioning adjacent an incorrect track is substantially eliminated.

nected to the output of subtracter 108, so that zero detector 122 will produce an output signal when the output of subtractor 108 is zero, or, in other words, when the present binary track address corresponds to the desired binary track address. Zero detector 122 may typically comprise a NAND gate connected to all of the digits or places of the subtracter 108. Thus, when all of the digits are 0's, the output of zero detector 122 will be a 1. In this manner, switching circuitry 112 will be actuated when the head reaches the desired track, causing the switches to assume the opposite states from those depicted in the drawings.

In this second mode of operation, the output of digital-to-analog converter 110 and rate circuit 120 are disconnected from the input of servo amplifier 114, and the composite output signal of differential amplifier 118 is substituted therefor via switch 112c of switching circuitry 112. Since the composite signal from differential amplifier 118 is related to the displacement of the head, the electronic control circuit C will thus be interconnected in a position servo loop or system. Referring once again to FIG. 5, it is apparent that each zero crossing of the composite signal represents a distinct track position. By exciting servo amplifier circuitry 114 with this signal, the servo loop will tend to drive itself toward zero, or, in other words, toward the zero crossing or track position. Thus, the head will be accurately positioned or detented at the appropriate track position in the second mode of operation.

In operation, the electronic control circuits C will initially be in the second mode of operation or position servo mode. Upon receipt of a desired binary track address at input terminals 100, the binary number stored in register 102 will then differ from the binary number stored in register 106, causing a binary difference number to appear at the output of subtracter 108. Zero detector 122 will then actuate switching circuitry 112 causing the electronic control circuit C to assume the first mode of operation or velocity servo mode. The binary difference signal of the output of subtracter 108 will cause a voltage to appear at the output of digital-to-analog converter 110, which, in turn, will cause servo amplifier 108 to apply currents to coils 36 and 36'.

The head will accelerate in response thereto, causing rate circuit 120 to produce a velocity feedback signal. Thus, the head will soon assume a velocity corresponding to the voltage at the output of the digital-to-analog converter 110. As the head translates, the instant track address will gradually decrease, causing the binary difference signal at the output of subtracter 108 to gradually decrease. This, in turn, will cause the voltage at the output of digital-to-analog converter 110 to gradually decrease in a stepwise manner, resulting in the gradual deceleration of the head as it approaches the desired track.

When the head reaches the desired track, the instant track address will, of course, be equal to the desired track address, causing the output of subtracter 108 to go to zero. This, in turn, will cause zero detector 122 to actuate switching circuitry 112, thereby causing the electronic control circuit C to assume the second mode of operation or position servo mode. The electronic control circuit C will then drive coils 36 and 36' in such a manner as to continuously drive the composite signal at the output of amplifier 118 to zero, and thus to precisely position or detent the head at the desired track.

It is significant to note that in accordance with the present invention the head is translated directly from its present track address to the desired track address, without need for initialization. Moreover, the head is quickly accelerated and is gradually decelerated in such a manner as to minimize the head translation time interval. Accordingly, the electronic control circuit C is adapted to energize the actuator A in such a manner as to expeditiously translate and accurately position the head.

The foregoing description of electronic control circuit C, while accurate, neglects certain aspects of the preferred embodiment of the present invention, which will now be described with specific reference to FIG. 7, wherein the electronic control circuit C is depicted in greater detail.

First, subtracter 108 is, in practice, incapable of distinguishing whether the desired track address is greater or less than the instant track address. Thus, the voltage produced by digital-to-analog converter 110 is independent of the desired direction of head translation. Accordingly, it is necessary to condition the electronic control circuit C to translate the head in the appropriate direction. To this end, the outputs of registers 102 and 106 are applied to a comparator 200. Comparator 200 functions to compare the desired track address with the instant track address and to produce signals indicating whether the desired track address is higher or lower than the instant track address. The outputs of comparator 200 are applied to a register 202 wherein such information is stored during the head translation operation. Accordingly, the outputs of register 202 are applied to a pair of leads 204 and 206, so that a 1 will appear on lead 204 when the desired track address is greater than the instant track address, while a 1 will appear on lead 206 when the desired track address is less than the instant track address.

Leads 204 and 206 are connected to the control inputs of a controllable inverter circuit 208. The signal produced by digital-to-analog converter 110 is applied to inverter 208, which functions to either conduct the signal directly therethrough to switching circuitry 112, or to invert the signal, in response to the signals on leads 204 and 206. Specifically, inverter circuitry 208 comprises two paths. The first path is through an electronic switch 210, controlled by the signal on lead 204. Thus, when the desired track address is greater than the instant track address, the output signal of digital-to-analog converter 110 will be conducted directly through inverter circuitry 208 to switching circuitry 112. The second path through inverter circuitry 208 consists of an inverting amplifier 212 and an electronic switch 214 in series, switch 214 being controlled by the signal on lead 206. Thus, when the desired track address is less than the instant track address, the output of digital-to-analog converter 110 will be inverted prior to application to switching circuitry 112. In this manner, the polarity of the signal thus applied to switching circuitry 112 is dependent upon the desired direction of head translation. Thus, for example, a positive voltage signal will be applied to the servo amplifier 114 when head translation in one direction is desired, while a negative voltage signal will be applied to servo amplifier 114 when head translation in the other direction is required. Of course, electronic switches 210 and The signal produced by coincidence circuit 224 is additionally applied to a reset input of register 202, so as to terminate the high or low signals on leads 204 and 206 in the second mode of operation, causing all of the electronic switches of the inverters 208 and 216 to be opened, and thereby providing further safeguards against the possibility of applying spurious signals to the servo amplifier in the position servo or second mode of operation.

As briefly referred to hereinbefore, servo amplifier 114 may be adapted to energize both coils 36 and 36' of actuator A, in such a manner as to achieve push-pull operation, but at the same time limiting the current to the repulsive coil so as to minimize demagnetization. To this end, the output of servo amplifier 114 is connected to a pair of diodes 226 and 228, the polarity of one diode being the opposite of the polarity of the other diode. Diodes 226 and 228 are respectively connected to one end of coils 36 and 36'. The other ends of coils 36 and 36' are connected in common to one end of a resistor 234. The other end of resistor 234 is grounded, resistor 234 functioning to convert the current in coils 36 and 36' into a voltage. This voltage is employed as a feedback signal for servo amplifier 114. Thus, the common point of coils 36 and 36' and resistor 234 is connected, via a lead 236, to the input of servo amplifier 114 to provide feedback therefor.

Diodes 226 and 228 function to direct the output current of amplifier 114 to the appropriate coil 36 or 36', to produce the desired motive force via attraction. Specifically, a positive voltage at the output of servo amplifier 114 will be conducted, via diode 228, through coil 36', while a negative voltage will produce a current through diode 226 and coil 36. These currents produce the attractive magnet forces referred to hereinbefore. In order to produce repulsive magnetic forces in the opposite coil, a pair of resistors 230 and 232 are provided in parallel with diodes 226 and 228, respectively. Resistors 230 and 232 function as current limiting resistors for the coil producing the repulsive magnetic force. Accordingly, a positive output voltage at the output of amplifier 114 will produce a relatively large current through diode 228 and coil 36', thereby providing the attractive force, while simultaneously producing a relatively small current through resistor 230 and coil 36, thereby providing the repulsive force. Conversely, a negative output voltage in the output of amplifier 114 will produce a relatively large current through diode 226 and coil 36, while simultaneously producing a relatively smaller current through resistor 232 and coil 36'. Accordingly, it is apparent that diodes 226 and 228 and resistors 230 and 232 cooperate to provide push-pull energization of coils 36 and 36', the current to the coil producing the repulsive force being limited through the resistors.

According to the preferred embodiment of the present invention, the resistances of resistors 230 and 232 are suitably selected so that the current therethrough produces repulsive magnet fields which, at their maximum, are below the knee on the hysteresis curve of the magnet rod 28. In this manner, it is assured that substantially no demagnetization will be produced by the repulsive fields. Moreover, since the attractive magnetic fields are substantially greater than the repulsive magnetic fields, the attractive magnetic fields will, at times, exceed the knee on the hysteresis curve of the magnet rod 28, thereby contributing to the magnetism of magnet rod 28 or, in other words, remagnetizing magnet rod 28. In this manner, the problems of demagnetization typically associated with voice coil type actuators are substantially eliminated, without the need for bulky magnets.

As referred to hereinbefore, the actuator system according to the present invention is further advantageous in that the head is quickly accelerated and is gradually decelerated, and translation of the head is accomplished without initialization. Moreover, the additional aspects of electronic control circuit C described with reference to FIG. 7 further minimize the possibilities of translation or positioning errors. Thus, the electronic control circuit C functions to energize actuator A in such a manner as to expeditiously translate and accurately position the head.

Figures 8, 9:
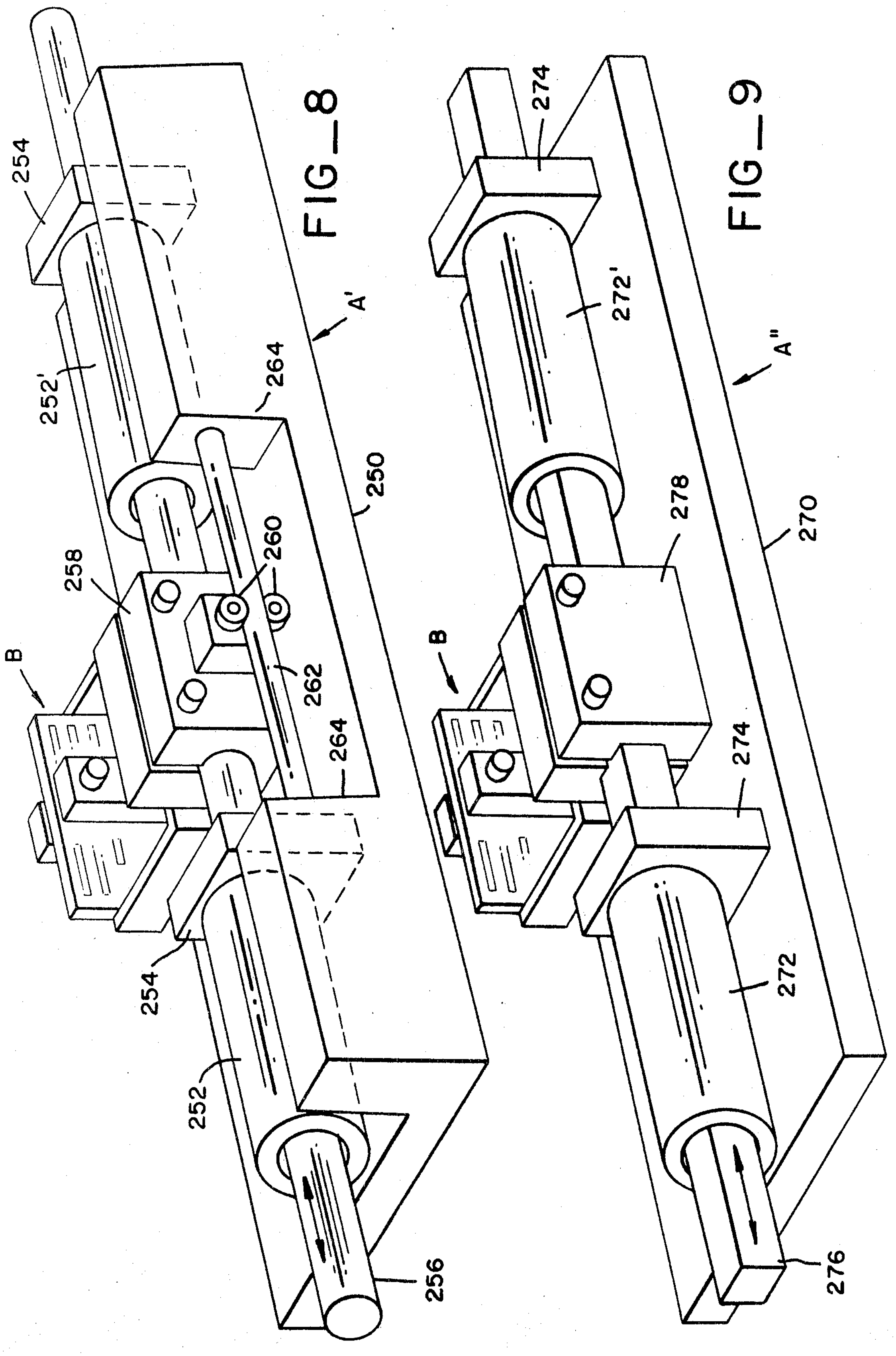
FIG. 8 is a perspective view, similar to FIG. 1, of another embodiment of the head actuator mechanism according to the present invention.
FIG. 9 is a perspective view, similar to FIG. 1, of yet another embodiment of the head actuator mechanism according to the present invention.

Referring now to FIG. 8, an alternative embodiment of the actuator mechanism or motive device according to the present invention will now be described in detail. Specifically, there is depicted in FIG. 8 an actuator or motive device A' comprising a base plate 250 carrying a pair of spaced apart electromagnet coils 252 and 252'. Disposed at one end of each of the coils 252 and 252' is a linear block 254. An elongate magnet rod 256 is disposed interior of coils 252 and 252' and is supported by the bearings in bearing blocks 254 for linear axial movement, as indicated by the arrows in FIG. 8.

Actuator A' is suitably disposed so that magnet rod 256 is radially directed with respect to the magnetic disc (not shown). A magnetic signal or read/write head (not shown) is mounted on one end of magnet rod 256 adjacent the magnetic disc. Thus, axial movement of magnet rod 256 will produce radial movement of the head with respect to the magnetic disc.

Accordingly, magnet rod 256 differs from the magnet rod 24 of actuator A depicted in FIGS. 1 and 2, in that magnet rod 256 is longer than magnet rod 24 and is directly supported and mounted in bearing blocks, to permit the head to be mounted directly thereto. In other respects, actuator A' is substantially identical to actuator A. Thus, as previously described, coils 252 and 252' are suitably energized to impart axial force to the magnet rod 256, which, of course, results in the desired radial movement of the head with respect to the magnetic disc.

A yoke 258 is mounted on magnet rod 256 intermediate coils 252 and 252'. Yoke 258 carries a pair of bearing rollers or wheels 260. Bearing wheels 260 engage a shaft 262 which is supported by a pair of shaft supporting blocks 264 in parallel with magnet rod 256. Bearing wheels 260 and shaft 262 cooperate to prevent rotation of magnet rod 256, and thus maintain alignment of the head, while readily permitting axial movement thereof. Yoke 258 additionally functions to carry the optical mask of the phototransducer assembly B, as described in greater detail hereinbefore.

The actuator A' according to the present embodiment functions in a manner substantially identical to that described with respect to actuator A. However, actuator A', by mounting the head directly to magnet rod 256, eliminates the need for a separate shaft therefor, and thus minimizes the mechanical complexity of the actuator.

Referring now to FIG. 9, yet another embodiment of the actuator or motive device according to the present invention will now be described in detail. Specifically, there is depicted an actuator A'' comprising a base plate 270 carrying a pair of spaced-apart electromagnet coils 272 and 272'. Disposed at one end of each of the coils 272 and 272' is a linear bearing block 274. An elongate magnet rod 276 is disposed interior of the coils 272 and 272' and is supported for axial movement by the bearings in bearing blocks 274.

Magnet rod 276 is substantially identical to magnet rod 256 described with respect to the actuator A' depicted in FIG. 8. However, magnet rod 276 possesses a square cross section, so that the bearings in bearing blocks 274 function to prevent rotation thereof. Thus, by employing a magnet rod 276 of square cross section, the need for further apparatus to prevent rotation of the magnet rod is eliminated, thereby further simplifying the actuator A''.

According to the present embodiment, magnet rod 278 is sufficiently elongate so that the head may be directly mounted on one end thereof. Thus, actuator A'' is suitably disposed so that magnet rod 276 will be directed radially with respect to the magnetic disc. Accordingly, electromagnet coils 272 and 272' are suitably energized to impart axial force to the magnet rod 276, and thus produce the desired radial translation of the head with respect to the disc.

Actuator A'' further comprises a yoke 278 mounted on magnet rod 276 intermediate electromagnet coils 272 and 272'. According to the present embodiment, yoke 278 functions primarily to mount and support the optical mask of the phototransducer assembly B.

The operation of actuator A'' is substantially identical to the operation of actuators A or A', previously described. However, it is apparent from FIG. 9 that by employing a magnet rod of irregular cross section, for example, the square cross section depicted in FIG. 9, and suitable linear bearings 274, the need for additional apparatus to prevent rotation of the magnet rod is eliminated.

While particular embodiments of the present invention has been shown and described in detail, it is apparent that adaptations and modifications will occur to one skilled in the art. For example, the actuator system according to the present invention may be employed with a drum-type memory rather than a disc. Of course, these and other modifications and adaptations may be made without departing from the true spirit and scope of the present invention, as set forth in claims.

What is claimed is:

1. An actuator for translating an element along a linear path comprising an elongate permanent magnet rod slideably mounted for axial movement, linkage means mechanically interconnecting said element and said magnet rod, a pair of electromagnet coils respectively disposed about the ends of said magnet rod, energizing means for energizing both of said coils to impart both attractive and repulsive axial force to said magnet rod and limiting means for limiting the current to the one coil imparting repulsive force to said magnet rod so that the magnetic field of said one coil at said magnet rod is smaller than the field corresponding to the knee on the hysteresis curve of said magnet rod, minimizing demagnetization of said magnet rod.

2. Apparatus according to claim 1 comprising phototransducer means for producing electrical signals representative of the linear position of said transducing element along said linear path, said energizing means being responsive to said electrical signals.

3. Apparatus according to claim 2 wherein said phototransducer means comprises an optical mask having binary addrss information coded thereon, photosensor means responsive to the information on said optical mask and means for translating said optical mask relative said photosensor means in response to movement of said transducing element.

4. An actuator for translating a signal head radially with respect to a magnetic disc comprising an elongate permanent magnet rod slideably mounted for axial movement, linkage means mechanically interconnecting said head and said magnet rod, a pair of electromagnet coils respectively disposed about the ends of said magnet rod and energizing means for energizing both of said coils to impart both attractive and repulsive azial force to said magnet rod including limiting means for limiting the current to the one coil imparting repulsive force to said magnet so that the magnetic field of said one coil at said magnet rod is smaller than the field corresponding to the knee on the hysteresis curve of said magnet rod, minimizing demagnetization of said magnet rod.

5. Apparatus according to claim 4 wherein said at least one coil is energized to impart attractive force to said magnet rod.

6. An actuator for translating an element along a linear path comprising an elongate magnet rod slideably mounted for axial movement, linkage means mechanically interconnecting said element and said magnet rod, a pair of electromagnet coils respectively disposed about the ends of said magnet rod, a servo amplifier, a apir of diodes respectively connected in series with said coils and the output of said servo amplifier, the polarity of one of said diodes being opposite from the polarity of the other of said diodes and a pair of resistors respectively connected in parallel with said diodes, said resistors having values suitable to limit the current therethrough to a level corresponding to a repulsive magnetic field at said magnet rod below the knee on the hysteresis curve of said magnet rod.

7. Apparatus according to claim 4 wherein said linkage means comprises a shaft slideably mounted for axial movement and disposed radially with respect to said disc, said shaft carrying said signal head at one end, said shaft being in parallel spaced apart relation with said magnet rod and a yoke interconnecting said shaft and said magnet rod.

8. Apparatus according to claim 4 comprising phototransducer means for producing electrical signals representative of the radial position of said head with respect to said disc, said energizing means being responsive to said electrical signals.

9. Apparatus according to claim 8 wherein said phototransducer means comprises an optical mask having digital track address information coded thereon, photosensor means responsive to the information on said optical mask and means for translating said optical mask relative said photosensor means in response to movement of said head.

10. Apparatus according to claim 9 wherein said digital track address information on said optical mask comprises parallel rows of binary information in the form of transparent and opaque areas, said photosensor means being adapted to respond to a column of said information.

11. Apparatus according to claim 10 wherein said photosensor means comprises a plurality of photosensors disposed in column alignment with respect to said rows, one of said photosensors being aligned with each of said rows, and a plurality of light sources disposed in registration with said photosensors on the opposite side of said optical mask therefrom to illuminate said photosensors through said optical mask.

* * * * *